United States Patent
Hebbar

(10) Patent No.: US 8,850,339 B2
(45) Date of Patent: Sep. 30, 2014

(54) SECURE CONTENT-SPECIFIC APPLICATION USER INTERFACE COMPONENTS

(75) Inventor: Vivek Hebbar, Sunnyvale, CA (US)

(73) Assignee: Adobe Systems Incorporated, San Jose, CA (US)

( * ) Notice: Subject to any disclaimer, the term of this patent is extended or adjusted under 35 U.S.C. 154(b) by 1759 days.

(21) Appl. No.: 12/022,007

(22) Filed: Jan. 29, 2008

(65) Prior Publication Data

US 2014/0033086 A1    Jan. 30, 2014

(51) Int. Cl.
*G06F 3/048* (2013.01)

(52) U.S. Cl.
CPC ..................................... *G06F 3/048* (2013.01)
USPC ........................................ 715/764; 715/744

(58) Field of Classification Search
CPC ........................................................ G06F 3/048
USPC .................................................. 715/744, 764
See application file for complete search history.

(56) References Cited

U.S. PATENT DOCUMENTS

| | | | |
|---|---|---|---|
| 6,188,399 B1 | 2/2001 | Voas et al. | |
| 6,392,671 B1 | 5/2002 | Glaser | |
| 6,731,310 B2 | 5/2004 | Craycroft et al. | |
| 7,073,130 B2 | 7/2006 | Novak et al. | |
| 7,278,109 B2 | 10/2007 | Shalabi et al. | |
| 7,340,716 B1 | 3/2008 | Chansler | |
| 2002/0024539 A1* | 2/2002 | Eleftheriadis et al. | 345/765 |
| 2003/0112262 A1* | 6/2003 | Adatia et al. | 345/716 |
| 2003/0151620 A1* | 8/2003 | Fujita et al. | 345/738 |
| 2004/0103207 A1* | 5/2004 | Elman et al. | 709/231 |
| 2004/0169680 A1* | 9/2004 | Stevens et al. | 345/763 |
| 2004/0189669 A1* | 9/2004 | David et al. | 345/619 |
| 2004/0201603 A1* | 10/2004 | Kalish | 345/700 |
| 2004/0207723 A1* | 10/2004 | Davis et al. | 348/14.04 |
| 2004/0216054 A1* | 10/2004 | Mathews et al. | 715/765 |
| 2005/0076306 A1* | 4/2005 | Martin et al. | 715/747 |
| 2005/0193368 A1* | 9/2005 | Becker et al. | 717/106 |
| 2005/0278793 A1* | 12/2005 | Raley et al. | 726/28 |
| 2005/0283806 A1* | 12/2005 | Torvinen | 725/62 |
| 2006/0090130 A1* | 4/2006 | Bent et al. | 715/530 |
| 2006/0101341 A1* | 5/2006 | Kelly et al. | 715/738 |
| 2006/0229741 A1* | 10/2006 | Achanta et al. | 700/23 |
| 2006/0230454 A1* | 10/2006 | Achanta et al. | 726/24 |

(Continued)

FOREIGN PATENT DOCUMENTS

WO  WO-2007064050 A1   6/2007

OTHER PUBLICATIONS

"Acrobat Security Administration Guide", *Adobe Systems Incorporated*, (May 31, 2007), 132 pgs.

(Continued)

*Primary Examiner* — Tuyetlien Tran
(74) *Attorney, Agent, or Firm* — Shook, Hardy & Bacon L.L.P.

(57) ABSTRACT

A method includes retrieving content information and associated user interface configuration information. The user interface configuration information relates to user interface elements (e.g., the "chrome" for a "skin") of a presentation application to present the content information. The user interface configuration information is verifying using a security component of the presentation application. The content information is presented using the presentation application, and the interface elements (e.g., the "chrome") for the presentation application is presented using the user interface information associated with the content information, during the presentation of the content information.

25 Claims, 7 Drawing Sheets

(56) References Cited

U.S. PATENT DOCUMENTS

| | | | |
|---|---|---|---|
| 2007/0005727 A1* | 1/2007 | Edwards et al. | 709/218 |
| 2007/0157194 A1* | 7/2007 | Balakrishnan et al. | 717/172 |
| 2007/0192818 A1* | 8/2007 | Bourges-Sevenier et al. | 725/132 |
| 2007/0214422 A1* | 9/2007 | Agarwal et al. | 715/744 |
| 2007/0271522 A1* | 11/2007 | Son et al. | 715/762 |
| 2008/0098296 A1* | 4/2008 | Brichford et al. | 715/234 |
| 2008/0168495 A1* | 7/2008 | Roberts et al. | 725/39 |
| 2008/0313632 A1* | 12/2008 | Kumar et al. | 718/100 |

OTHER PUBLICATIONS

"Chapter 23: Importing Skins into Flex Builder", *Adobe Flex 3 Beta 2, Flex 3 Developer's Guide*, (2007),673-683.

"Creating a Custom Skin", [Online]. Retrieved from the Internet: <URL: http:adobetutorialz.com/articles/2027/1/creating-a-custom-skin-swf>, (Jan. 18, 2008),4 pgs.

"Designing Flex 2 skins with Flash, Photoshop, Fireworks, or Illustrator", [Online]. Retrieved from the Internet: <URL: http://www.adobe.com/devnet/flex/articles/flex_skins.html, Adobe—Developer Center,(Jan. 18, 2008),2 pgs.

"Flex Quick Starts: Building from an Advanced User Interface", [Online]. Retrieved from the Internet: <URL: http://www.adobe.com/devnet/flex/quickstart/skinning_components/>, (Jan. 18, 2008),8 pgs.

"Graphical User Interface", [Online]. Retrieved from the Internet: <URL: http://en.wikipedia.org/wiki/User_interface_chrome>, (Jan. 17, 2008),5 pgs.

"Microsoft Silverlight", [Online]. Retrieved from the Internet: <URL: http://en.wikipedia.org/wiki/microsoft_silverlight>, (Jan. 21, 2008),7 pgs.

"Microsoft Silverlight: Developing Siverlight Media Player Skins", Microsoft Corporation, (2007),22 pgs.

"Skin (Computing)", [Online]. Retrieved from the Internet: <URL: http://en.wikipedia.org/wiki/skin_%28computing%29>, (Jan. 17, 2008),2 pgs.

"SWF", [Online]. Retrieved from the Internet: <URL: http://en.wikipedia.org/wiki/SWF>, (Dec. 11, 2007),2 pgs.

* cited by examiner

SECURE CONTENT-SPECIFIC APPLICATION USER INTERFACE COMPONENTS

COPYRIGHT NOTICE

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever. The following notice applies to the software and data as described below and in the drawings that form a part of this document: Copyright 2008, ADOBE SYSTEMS INCORPORATED, All Rights Reserved.

BACKGROUND

A Graphical User Interface (GUI) is an interface that allows users to interact with an application or program executed on a computer system. GUI design is an important part of application programming, and seeks to enhance the efficiency and use of the underlying logical design of a program. The visible graphical interface features of an application are sometimes referred to as "chrome" and include graphical elements (e.g., widgets) that may used to interact with a program. Examples of common widgets include windows, buttons, menus, and scroll or other navigation bars. Larger widgets, such as windows, provide a frame or container for the main presentation content, such as webpage, email message or drawing. Widgets of an application may be functionally independent of and indirectly linked to program functionality. This allows a GUI to be customized using different "skins." Skins may be associated with themes as custom graphical appearances that may be applied to certain software. A software program which is capable of having a skin applied may be referred to as being "skinable" and the process of writing or applying a skin may be known as "skinning". Applying a skin may change the look and feel of a software program, and may accordingly have an aesthetic focus. Other skins may rearrange elements on interface or even provide new interface functionality.

A number of customized skins are available for certain applications (e.g., for instant messaging and media player applications). Further, certain browsers (e.g., the MOZILLA and OPERA web browsers) are skinable as a result of the availability of cross-platform toolkits.

BRIEF DESCRIPTION OF DRAWINGS

Some embodiments are illustrated by way of example and not limitation in the figures of the accompanying drawings in which.

DETAILED DESCRIPTION

Figure 1:
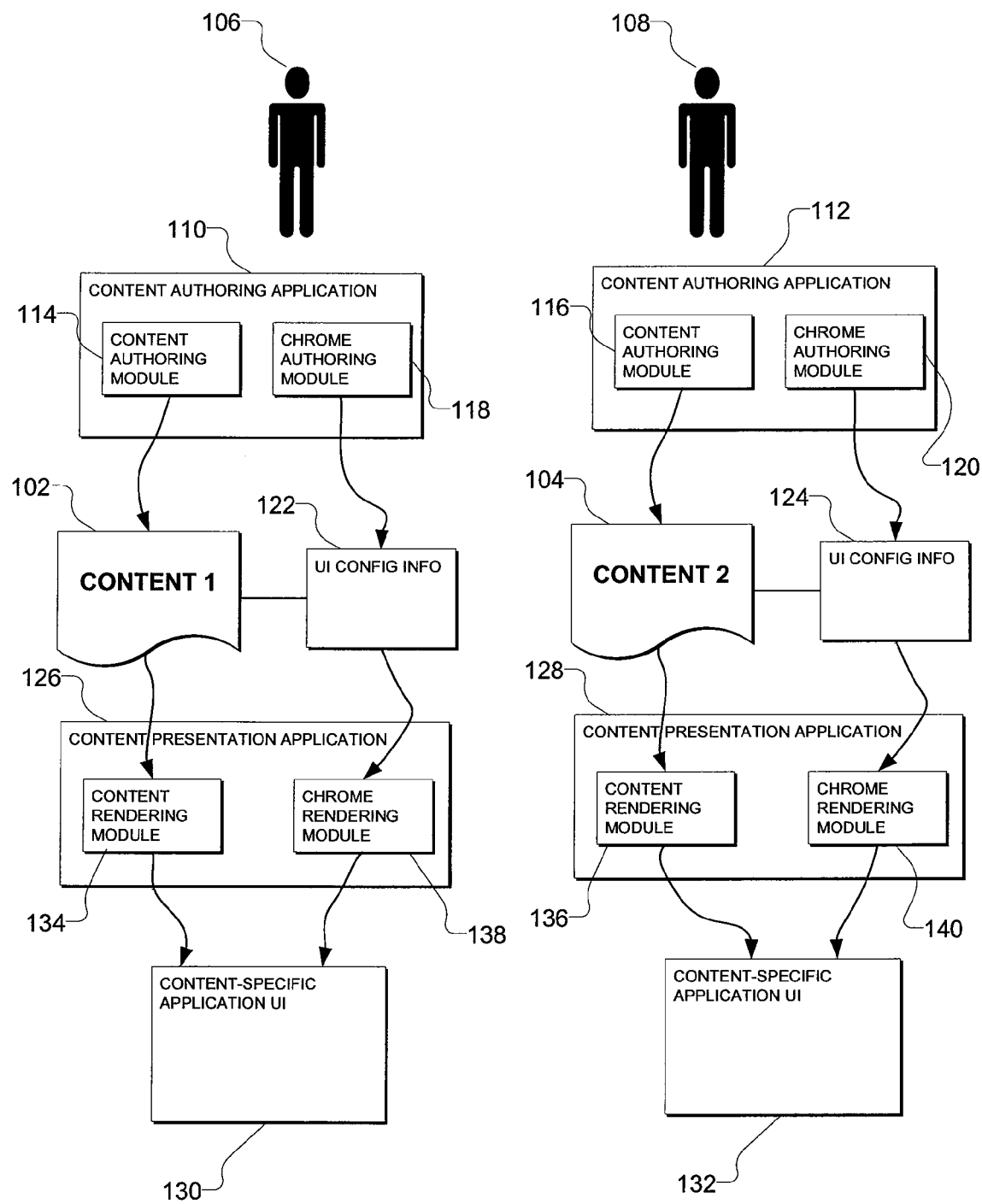
FIG. 1 is a diagrammatic representation of a process for configuring an application interface utilizing user interface (UI) configuration data associated with content to be presented by the application, according to an example embodiment.

In the following description, for purposes of explanation, numerous specific details are set forth in order to provide a thorough understanding of some example embodiments. It will be evident, however, to one skilled in the art that the present invention may be practiced without these specific details.

An example embodiment seeks to provide mechanisms whereby a content creator (e.g., a document author) or a content provider can provide rich user interface configuration specifications (e.g., "skins") that may be contained in, or associated with, the content, and that may be used by a content presentation application to generate "chrome" or an application user interface.

For the purposes of the present application, the term "chrome" shall be taken to mean any one or more elements or components of a user interface of a software program or application. The term "skin" shall be taken to mean a collection of elements or components of a user interface of a software program or application.

While example embodiments are below discussed with reference to a document, it will be appreciated that the described methods and systems may equally well be deployed with other content types such as graphic, image, audio or video content, merely for example.

Consider an example in which a document author wishes to provide a customized viewing experience with respect to a particular document. While the author may have creative freedom to provide such viewing experience in a presentation area (e.g., document area), example embodiments enable the document author to customize and configure the user interface of other areas (e.g., "chrome" user interface area) of a content presentation application (e.g., a document presentation application such as MICROSOFT WORD® or ADOBE® ACROBAT®). Example embodiments may provide the capability for a content presentation application to include application "chrome" having a mix of components provided by an application vendor (e.g., MICROSOFT® or ADOBE®) and the author of content displayed by the content presentation application. Further, an example embodiment may enable the provision of "skins" or other user interface elements, provided by a content author and associated with content, to be presented within the security context of a particular content presentation application. Accordingly, the security context of an application may be leveraged to prevent restricted action (e.g., inadvertent or malicious) that could arise from execution of a user interface component not provided by the content presentation application supplier An example embodiment further provides a shared marketplace for the provision of user interface components (e.g., document chrome components), that may be made available to authors for content enhancement purposes.

In an example embodiment, a content authoring application (e.g., the ADOBE® ACROBATS application) includes functionality to enable an author to associate application user interface configuration information with content. For example, a content authoring application may provide the ability of an author to embed a user interface scriptable object (e.g., a SHOCKWAVE FLASH® (SFW) object) within content (e.g., a Portable Document Form (PDF) document). The user interface configuration information may be used in specific areas of application chrome (e.g., in the "chrome" of the ADOBE® ACROBAT® application). For example, the user interface configuration information may specify the display, placement and appearance of any number of user interface elements such as buttons, check boxes, indicia, menus, bookmarks, toolbars, navigation panels or icons.

A content presentation application (which may or may not be the same application as the content authoring application) may furthermore be provided with the functionality to detect the presence of user interface configuration information associated with content (e.g., discover a UI object embedded within a document) and to use the user interface configuration information to configure user interface of the content presentation application (e.g., to create a skin navigation panel within a document application). To this end, the content presentation application provides an Application Program Interface (API) to retrieve data from a content file (e.g., a document), and to feed it to an executable user interface object (e.g., a SWF object). Specifically, a user interface object (e.g., a SWF object) uses the API of the content presentation application to retrieve user interface data from a content file, and present it to a user in a manner provided by the content author, but controlled by the content presentation application. Further, in an example embodiment, the content presentation application executes the user interface object within a protected environment (e.g., a sandbox) with rules governed by the content presentation application. In this way, the content presentation application may utilize built in security functionality to ensure that a user interface object does not negatively impact the execution of the content presentation application or the computer system on which it is executing.

In one example embodiment, the execution of a user interface object (e.g., a SWF object) within the context of a document presentation application (e.g., ADOBES ACROBAT®) is facilitated by a plug-in (e.g., the ADOBES FLASH® player) to the document presentation application. By combining the abilities of a content presentation application to render content in a predictable and secure manner (e.g., as a fixed formal document), and the ability of a user interface renderer (e.g., the ADOBE® FLASH® player) to provide a rich user interface, an example embodiment enables a content file (e.g., a document) that exposes a rich user interface for an application. The exposure of an author-configured rich user interface for an application is, in the example embodiment, is enabled such that the user interface configuration information (e.g., a user interface object executed by a user interface renderer) does not bypass security functionality of the content presentation application. For example, the general vulnerabilities of a content presentation application (e.g., such as "phone home" or external resource accesses) may be blocked by the security functionality of the content presentation application.

Considering a further example embodiment, a document may include an embedded user interface object (e.g., a SWF object) for a "bookmark" user interface component to be displayed as part of a content presentation application interface. The content presentation application, in an example embodiment, loads the document, detects the embedded user interface object, and creates a navigation panel view that hosts the embedded user interface object. Bookmark data for the document is supplied by the content presentation application to the user interface object through an API or other data bridge. All external accesses from the user interface element are channeled through security functionality of the content presentation application. Where a user interface renderer plug-in is used to present the navigation panel view, the user interface renderer may allow or deny data accesses, based on permissions provided by the content presentation application.

FIG. 1 is a diagrammatic representation of a process, according to an example embodiment, to enable a content file (e.g., a document) to provide user interface components to a presentation application (e.g., a word processing or document presentation application). Specifically, FIG. 1 illustrates the example process being performed with respect to distinct instances of content in the form of a first document 102, and a second document 104. In each case, a respective content authors 106, 108 use a content authoring application 110, 112 (e.g., word processing application) to generate a respective document 102, 104. Each of the content authoring applications 110, 112 includes a content authoring module 114, 116 that enables the authoring of content in the form of the documents 102 and 104.

In one embodiment, each of the content authoring applications 110, 112 may include a user interface authoring module 118, 120 (e.g., a "chrome" authoring module) using which a content author may generate user interface configuration information 122, 124 to be used by a content presentation application 126, 128 to generate and to present content-specific user interface elements 130, 132. Each content presentation application 126, 128 is shown to include a content rendering module 134, 136 (e.g., a document area) and an application interface rendering module 138, 140 (e.g., a "chrome" area) that uses the user interface information 122, 124 to generate the content-specific application user interface elements 130, 132.

FIG. 1 illustrates that, even though a common content application 126, 128 (e.g. a word processing or document rendering application) may be used to present (and enable editing of) the respective instances of the documents 102, 104, the user interface information 122, 124 may be used to provide content-specific application user interface components 130, 132, for each of the applications 126,128, when presenting the documents 102, 104. Accordingly, a content author 106, 108 is provided with the capability not only to generate unique content (e.g., a document 102, 104), but also to customize and configure the interface of an application that is utilized to view and/or access the relevant content.

While the user interface authoring modules 118, 120 are shown in FIG. 1 to form part of the content authoring applications 110, 112, the content and the user interface configuration information need of course not to be authored using the same application. For example, where the user interface information 122, 124 comprises an SWF object, such object may be authored using the ADOBE® FLEX® application, the ADOBE® FLASH® CS3 application or the ADOBE® FIREWORKS® application.

The association between content, example form of the documents 102, 104, and the respective user interface information 122, 124 may be achieved in various ways. In one example embodiment, the user interface information 122, 124 may be embedded within a document 102, 104. Alternatively, some reference may be provided within the document 102, 104, that enables a content presentation application 126, 128 to retrieve the associated user interface information 122, 124 from an identified location.

Figure 2:
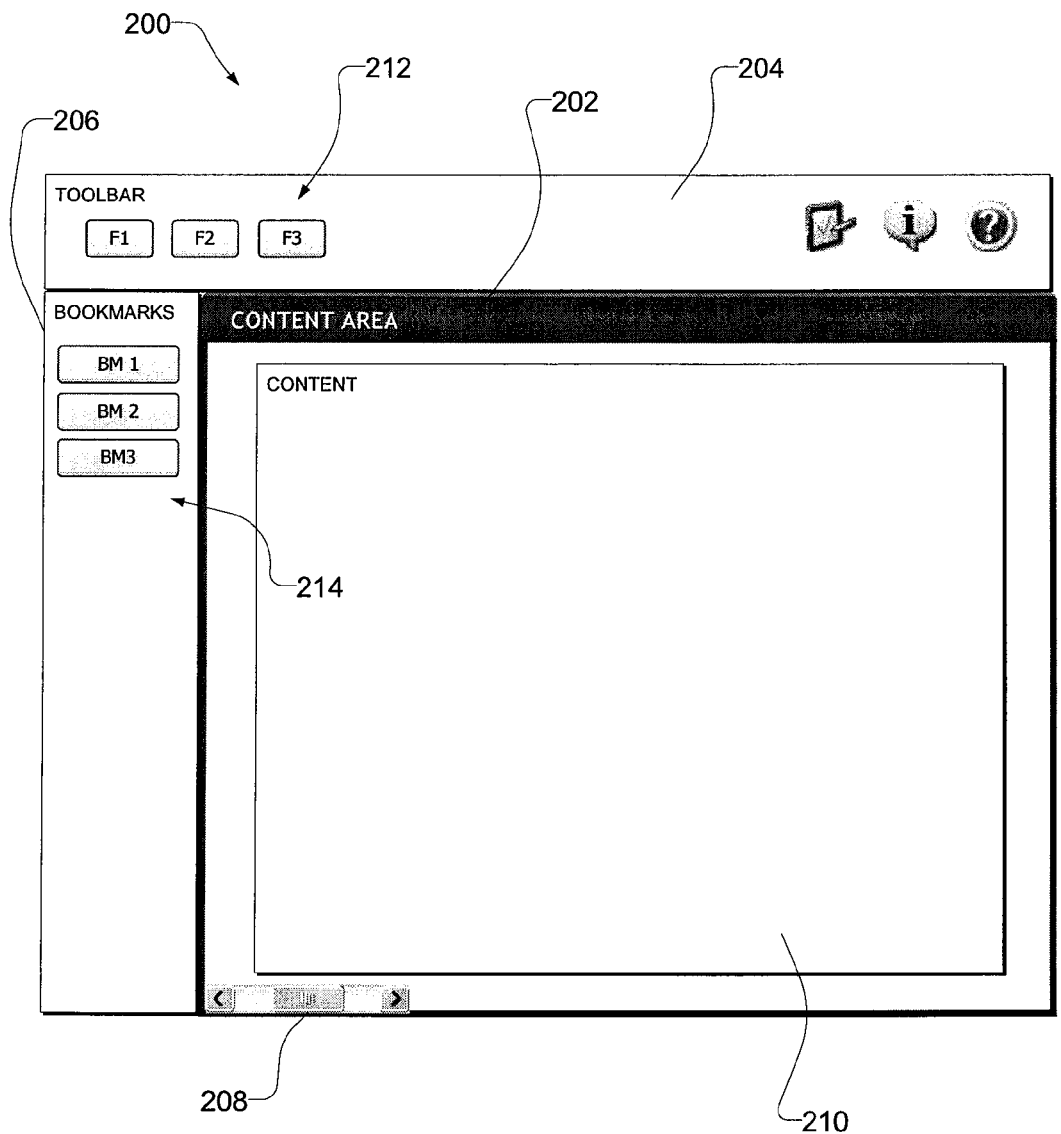
FIG. 2 is a screenshot illustration of an interface, according to an example embodiment and configured according to UI configuration information associated with content, to include certain "chrome" user interface elements.

FIG. 2 is a diagrammatic representation of an example application user interface 200 that includes a content area 202 and application "chrome", which in turn includes a toolbar 204, a bookmark navigation panel 206, and a scroll control 208. The application chrome 204, 206 and 208 may be configured and customized when an application presents associated content 210 within the content area 202, as a result of the presentation application recognizing and using user interface information, associated with the content 210, to configure the interface 200. The customizations of the application chrome may be achieved utilizing user interface information that may include both visual and functional configurations. For example, the "look and feel" of the chrome elements 204, 206, and 208 may be configured by applying a common color or visual background for each of the chrome elements.

In addition to configuring the "look and feel" of the chrome elements 204, 206, 208, the user interface information 122, 124 may specify application functionality that is accessible via the user interface 200. For example, a unique set of toolbar functions 212 for the content 210 may be specified by the user interface configuration information. Similarly a unique renderer of bookmarks 214, to be included in the bookmark navigation panel 206 and specific to the content 210, may also be specified by the user interface configuration information.

The use of a rich media mechanism to generate the chrome elements 204, 206 and 208 may furthermore allow for the creation and display of any number of visual effects and customizations with respect to the chrome elements. For example, the appearance of buttons icon, or graphics within the toolbar 204 or the bookmark navigation panel 206 may be altered upon detecting a mouse over event with respect to these buttons. Further, the user interface information may enable certain user functionality and customization with respect to the chrome elements 204, 206 and 208. Using drag and drop operations, a user may be enabled to specify an ordering of bookmark buttons 214 or toolbar function buttons 212. In further example, the ordering of the toolbar buttons 212 or bookmarks buttons 214 may be automatically performed based on certain criteria that are specifiable by the user.

Figure 3:
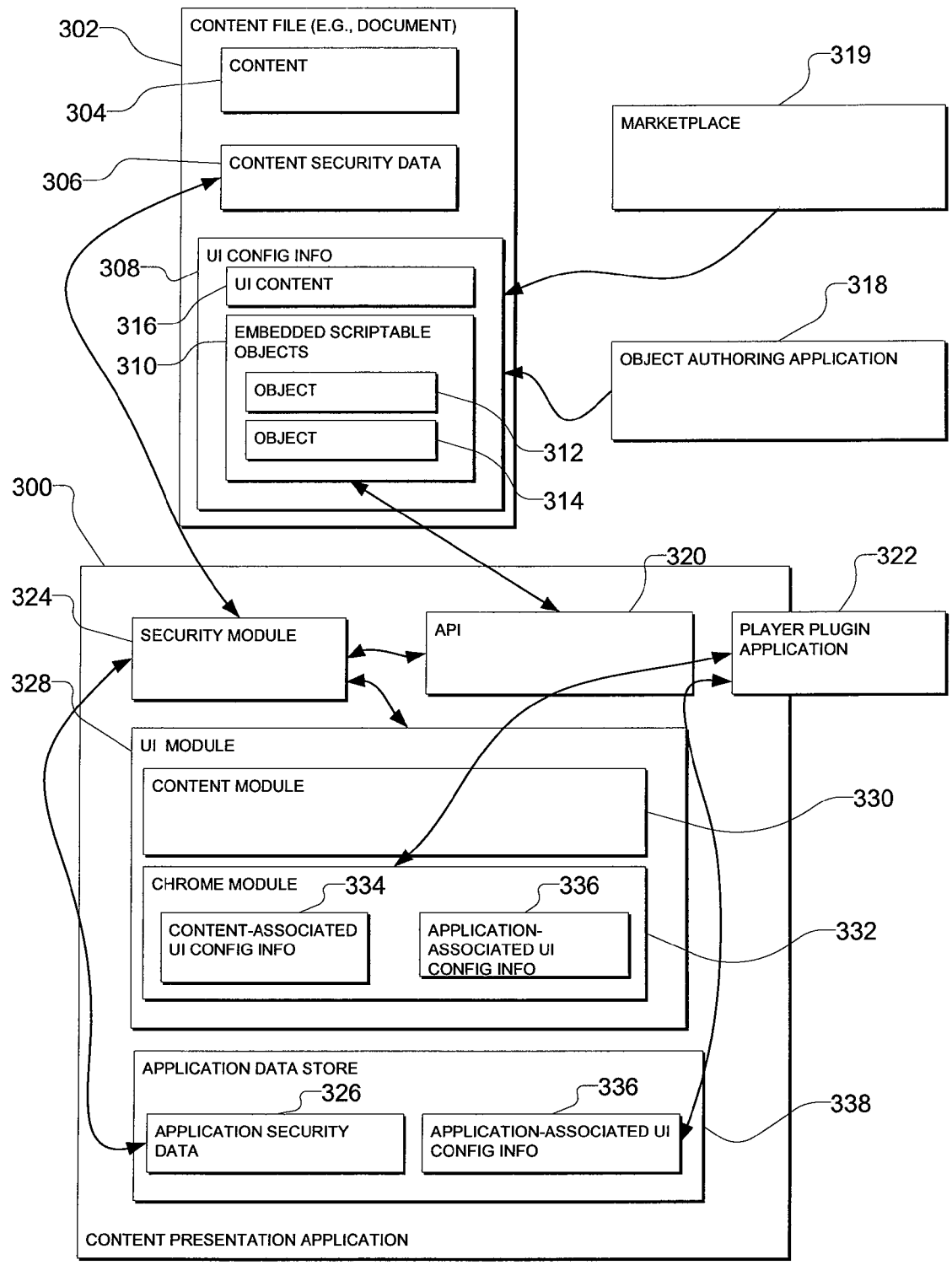
FIG. 3 is a block diagram illustrating the architecture of a content presentation application, according to an example embodiment, for which the interface may be dynamically configured and reconfigured based on configuration information associated with various instances of content.

FIG. 3 is a block diagram illustrating architecture for a content presentation application 300, configured according to an example embodiment. FIG. 3 also shows the structure and content of a content file 302, in the example form of a document, created according to an example embodiment. It will however be appreciated that content file 302 maybe any type of content file, such as a graphic, image, audio or video file.

Starting with the content file 302, this is shown to include digital content 304 and associated content security data 306. The content security data 306 may specify access rights and constraints with respect to the content 304 that are observed by an application used to access, render and present the content 304. For example, the content security data 306 may specify a username and password required to access the content 304, as well as rights to reproduce (e.g., print) or manipulate (e.g., copy or edit) the content 304.

The content file 302 also includes user interface configuration information 308 that is associated with the content 304 (e.g., as a result of being included within the content file 302). The user interface configuration information 308, in an example embodiment, includes a collection of embedded user interface scriptable object 310. Each of the user interface objects 312 within the collection 310 is responsible for generating an element of a user interface of the content presentation application 300 (e.g., the "chrome" of the content presentation application 300). As such, one object 312 may be responsible for generating the toolbar 212 as shown in FIG. 2, while another object 314 may be responsible for generating the bookmark navigation panel 206.

The user interface configuration information 308 also includes user interface content 316 that is utilized by the collection of objects 310 in the rendering of user interface elements for the application 300. The user interface content 316 may be, for example, image, video or audio data.

The user interface configuration information 308 may be generated, at least partially, by an object authoring application 318. In various example embodiments, the user interface configuration information 308 may include bitmap images, scriptable object (e.g., JavaScript objects or SWF objects), media content (e.g., WMV, WMA, MP3 or QuickTime files), bitmap graphics, vector graphics or class files that contain drawing methods to define vector images. The user interface configuration information 308 generated by an authoring application 318 may define the entire appearance, or only part of the appearance, of an element of the "chrome" of the application 300. For example, a "button" control defined by the user interface configuration information 308 may have a number of possible states, with each state having a unique "skin" or appearance property.

Where the authoring application 318 is utilized to generate "skins" for inclusion within the user interface configuration information 308, these skins may be graphical skins (e.g., bitmap graphics) that are made up of individual pixels to form an image. The "skins" may also include programmatic skins (e.g., vector graphics) that consist of a set of line definitions that specify, for example, the starting and end of a line, line thickness, color and other information required by a player application to render the vector graphic. Programmatic skins provide a greater degree of programmatic control over a skin than a graphical skin. A statefull skin is a type of programmatic skin that uses view states, where each of the state corresponds to a state of user interface component. The definition of the view state controls the appearance of the "skin" component.

In various embodiments, the authoring application 318 may comprise the ADOBE® FLASH®, ADOBE® ILLUSTRATOR®, ADOBE® PHOTOSHOP® and ADOBE® FIREWORKS®.

A user may also elect to download or otherwise obtain pre-authored user interface information. To this end, the user may initiate a connection between a local computer system and a user interface information store (e.g., a marketplace 319 or other repository).

The content presentation application 300 includes an API 320 by which the various module and components of the application 300 access data (e.g., the content file 302), and interface with external applications (e.g., a player plug-in 322). A security module 324 provides security functionality to the application 300, and may enforce both content and application security constraints (e.g., specified by the content security data 306 and application security data 326.)

A user interface module 328 includes a content module 330 to generate and present a content area within a user interface (e.g., the content area 202) and a chrome module 332 to generate and present a "chrome" area of the application user interface (e.g., the chrome components 204, 206 and 208). The chrome module 332 is shown to execute both content-associated user interface objects (e.g., the user interface configuration information 308) and application-associated user interface configuration information 336, which may be retrieved from an application data store 338. In one embodiment, the chrome module 332 may, via the API 320, invoke execution of the player plug-in application 322 to render elements and components of the chrome area. To this end, the player plug-in application may, for example, ADOBE® FLASH® player, the ADOBE® SHOCKWAVE® player, A JAVA FX player, the APPLE® QUICKTIME® player, a WINDOWS MEDIA player or the MICROSOFT® SILVERLIGHT® player to set.

Figure 4:
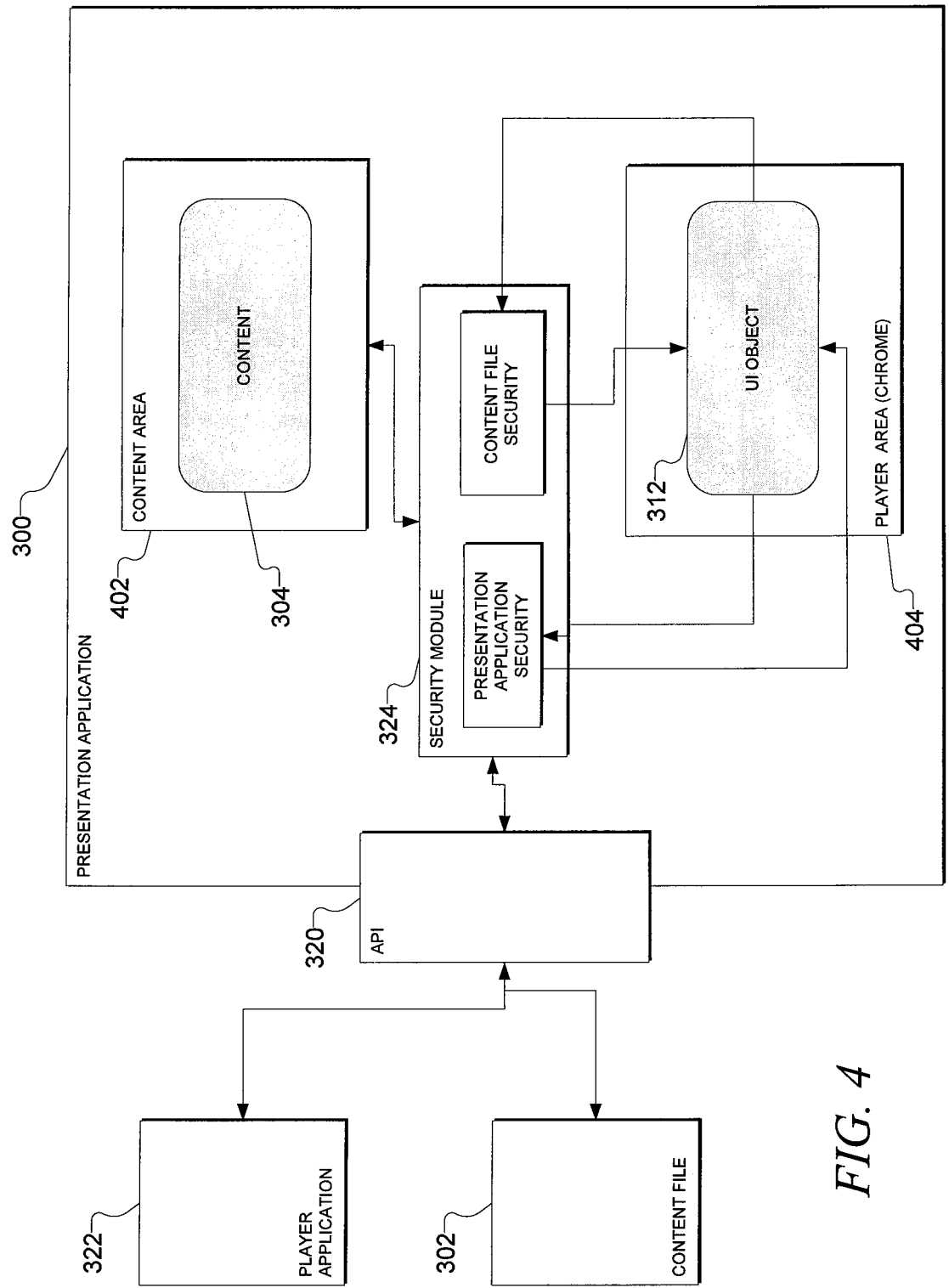
FIG. 4 is a block diagram providing an alternative view of the architecture of an application, according to an example embodiment, for which application "chrome" user interface components are provided in a secure manner.

FIG. 4 is a block diagram again illustrating the architecture of a content presentation application 300, according to an example embodiment, and particularly showing further details regarding a security module 324. FIG. 4 illustrates that a content area 402, instantiated by the content module 330 and a player area 404, instantiated by the chrome module 332, interface with a player application 322 and a content file 302 via a security module 324 and the API 320. Specifically, requests from the content area 402 for content 304 within content file 302 are filtered through the security module 324, which implements both presentation application security (e.g., as defined by the application security data 326) and content file security (e.g., as specified by the content security data). The security module 324 may require that the player 322 callback into the presentation application 300 for all external accesses, with the access requests being subject to both application and content security. Communications between the player 322 and the presentation application 300, in one embodiment, may be performed using eXtensible Markup Language (XML) messages, which are converted into code on either side of the API 320, and accordingly may expose some security vulnerabilities. For example, external SWF objects could use custom external interface messages, or URL streaming to trigger attacks. Accordingly, the security module 324 may use a host API mesh to enforce API security. Security measures that may be enforced by the security module 324 with respect to external user interface objects (e.g., SWF objects) may include preventing access to a local file system, preventing access to the Internet without passing through a URL trust manager, preventing the use of local connection and shared objects, preventing access to service without "*" in their domain files, preventing access URLs whose schemas are not listed in any white list maintained by the security module 324, and preventing the streaming of FLVs from a streaming server without passing through a URL trust manager.

Similarly, requests from the player area 404, and specifically from user interface object 312 executing within the context of the player area 404, are channeled via the security module 324 to the API 320, in order to allow the user interface object 312 to retrieve user interface content 316 from the content file 302. In this way, the presentation application 300 enables both document and application security to be applied with respect to access requests from the user interface object 312 via the API 320. As a user interface object 312 maybe a scriptable object (e.g., object 312) originally embedded in the content file 302, and accordingly potentially authored by an unknown entity, the enforcement of application and content security by the content module 330 provides protection against malicious or otherwise risky user interface objects. The leveraging of the security functionality provided by the security module 324 may, for example, enable a developer of the presentation application 300 to safely provide the ability to the presentation application 300 to process user interface objects from unknown sources. This is because security functions and requirements of the presentation application, which are under control of a developer of the presentation application 300, can be applied to foreign user interface objects executed within the context of the presentation application.

Figure 5:
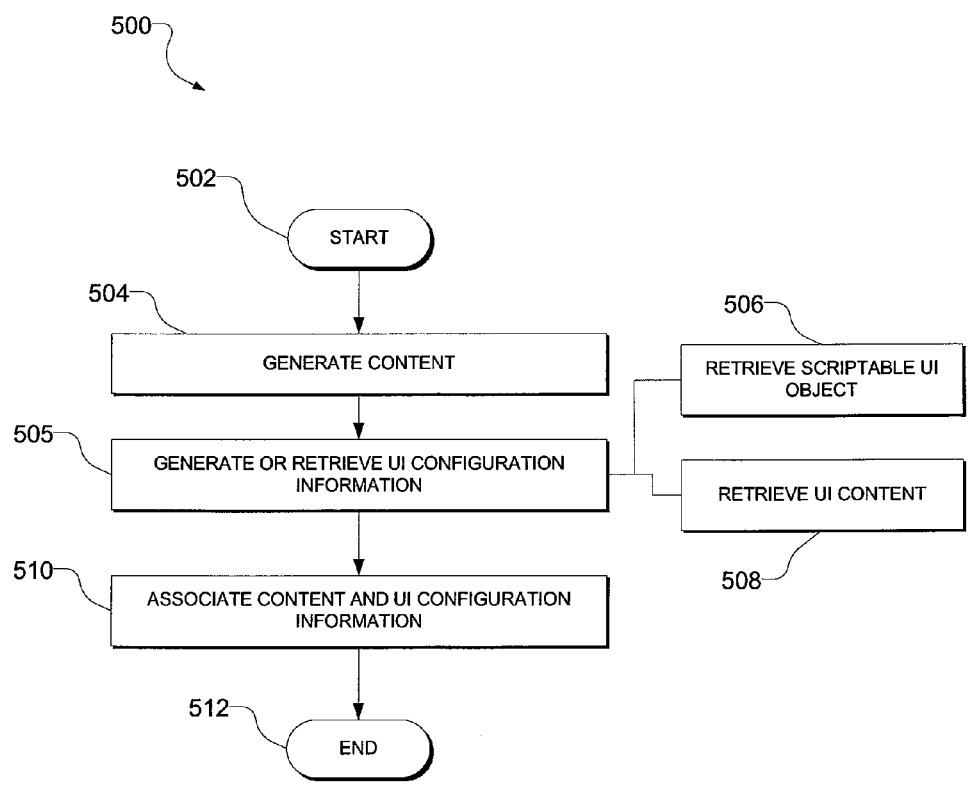
FIG. 5 is a flowchart illustrating a method, according to an example embodiment, to associate user interface configuration information with a particular instance of content to be displayed by an application.

FIG. 5 is a flowchart illustrating a method 500, according to an example embodiment, to associate user interface information, for a presentation application, with specific instance of content (e.g., a document, audio, video or image file). The method 500 commences at operation 502, and proceeds to operation 504 at which a user may generate an instance of content. For example, a user may utilize a content authoring application (e.g., word processor, audio, image or video creation application) to create a content file.

At operation 505, a user may then generate or download user interface configuration information to configure (e.g., modify or replace) components of the interface of an application that will be utilized to present, modify or otherwise manipulate the content 304. As mentioned above, with respect to FIG. 3, the user interface configuration information may be generated utilizing, at least in part, an object authoring application. To this end, the downloaded or generated user interface information may include a scriptable user interface object (e.g., a SWF object) 506 and associated user interface content 508 (e.g., images or similar information to be utilized by the scriptable object 506). In other embodiments, the UI information may, merely for example, be any one of the types of user interface information discussed herein.

As opposed to generating the user interface configuration information at operation 505, a user may also elect to download or otherwise obtain pre-authored user interface configuration information. To this end, the user may initiate a connection between a local computer system and a user interface configuration information store (e.g., a marketplace 319 or other repository). The user may then select and download selected user interface configuration information (e.g., a skin or other "chrome" component).

At operation 510, the user then associates the content, generated at operation 504, with the user interface configuration information. In one embodiment, this association may be achieved by embedding the user interface configuration information (e.g., a user interface scriptable object) within a content file that includes both the content and the user interface configuration information. In other example embodiments, the content may be associated with the user interface configuration information through a referencing scheme or any one of a number of known association schemes or mechanisms. The method 500 then terminates at operation 512.

Figure 6:
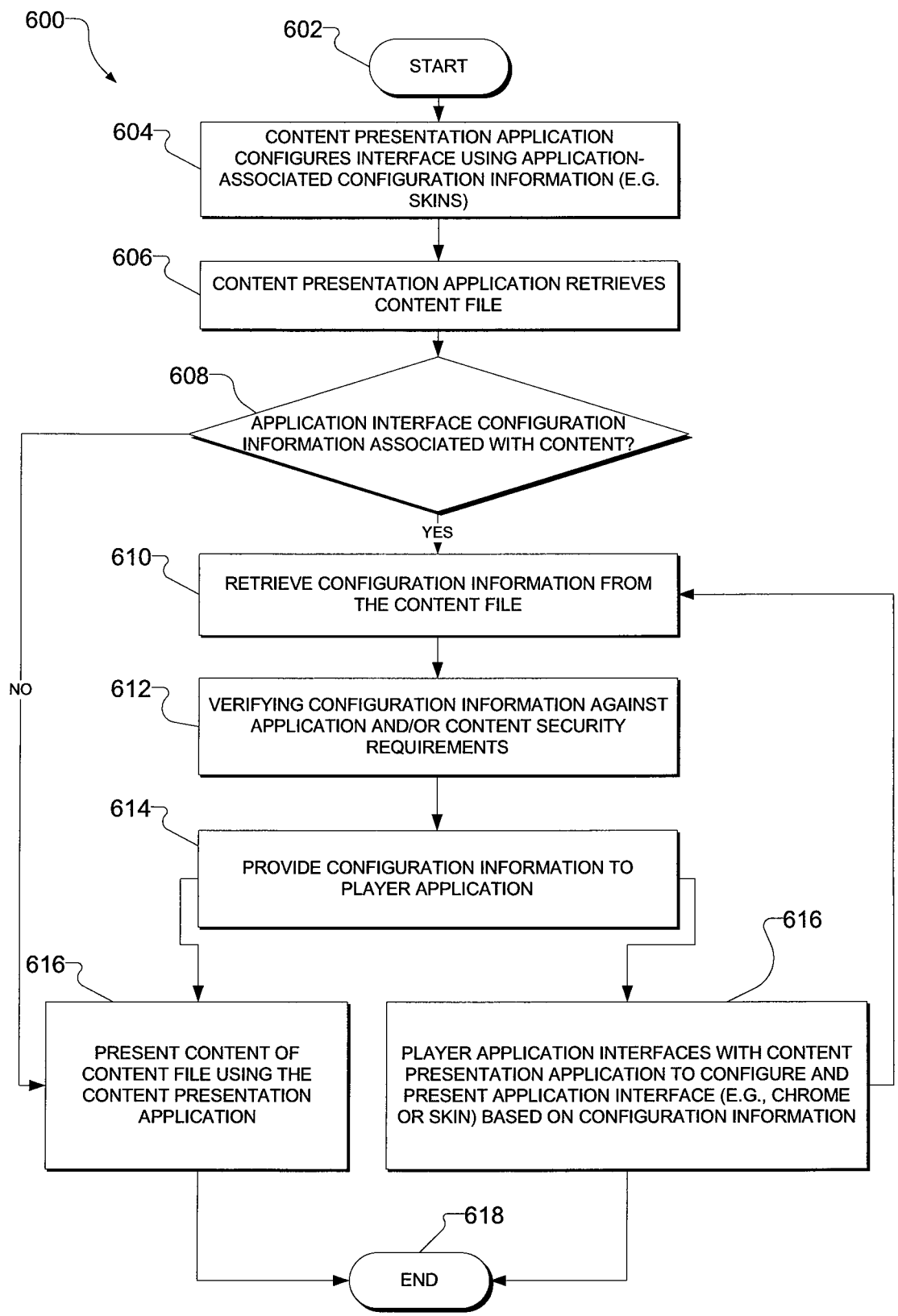
FIG. 6 is a flowchart illustrating a method, according to an example embodiment, to configure an application interface based on configuration information associated with a particular instance of content to be displayed by an application.

FIG. 6 is a flowchart illustrating a method, according to an example embodiment, to customize an interface of a content presentation application, when presenting specific instance of content, using user interface configuration information specifically associated with that content. In an example embodiment, the operations of the method 600 may be performed by a content presentation application (e.g., the application 300 described above) in an automated manner.

The method 600 commences at operation 604 with the content presentation application 300 configuring an application interface utilizing application-associated user interface configuration information. In one example, the chrome module 332 may utilize the application-associated user interface objects and configuration data 336 to configure certain elements or components of the application user interface. This configuration of the chrome components may be performed prior to rendering of the interface so as to enable subsequent modification utilizing content-associated user interface configuration information 308. The application-associated user interface configuration information may specify default or standard configurations for user interface elements of the application.

At operation 606, the content presentation application 300 retrieves or accesses the content file 302.

At decision operation 608, the content presentation application determines whether user interface configuration information 308 is associated with content 304 of the content file 302. To this end, the application 300 may include a parser to parse the content file to detect the presence of the user interface configuration information 308. The parser may form part of the user interface module 328.

If user interface configuration information 308 is detected at decision operation 608, the presentation application 300 (e.g., the chrome module 332) retrieves the user interface configuration information 308 from the content file 302, via the security module 324 and the API 320.

In one example embodiment, the retrieval of the user interface configuration information 308 may include first obtaining embedded user interface scriptable objects from the content file 302, and executing these within the context of the content application 300, utilizing a player plug-in application 322. The user interface scriptable object may in turn require certain user interface content 316, also embedded in the content file 302. Accordingly, retrieval of the configuration information may include processing access requests, from UI scriptable objects (executing within the content of the application 300) to the content file 302. As previously described, these access requests may be directed via the security module 324, which subjects the access requests to both application and content security constraints. Access requests that do not violate these security constraints may then be passed through to the API 320, via which the relevant user interface content 316 may be retrieved from the content file 302. Accordingly, at operation 612, the presentation application 300, utilizing the security component 324 may verify the configuration information against application and content security constraints and requirements.

At operation 614, the configuration information may be provided, from the user interface module 328 of the application 300 and by the API 320, to a player plug-in application 322. The player plug-in application 322 assists the user interface module in rendering user interface elements for the application, based on the user interface configuration information 308.

Accordingly, at operation 616, the user interface module, and specifically the content module 330, may present content 304 of the content file 302.

At operation 618, the player plug-in application 322 interfaces for the application 300 via the API 320 to assist in the configuration and rendering of interface components (e.g., chrome components or a skin for the application 300) based at least partially on the user interface configuration information 308.

The method 600 then terminates at operation 618.

The method 600, described above may be used to configure user interface of an application according to interface configuration information, associated with specific instance of content presented by the application, and then to reconfigure the user interface of the application according to further interface configuration information, associated with further content presented by the application.

Modules, Components and Logic

Certain embodiments are described herein as including logic or a number of components, modules, or mechanisms. A component may be a tangible unit capable of performing certain operations and is configured or arranged in a certain manner. In example embodiments, one or more computer systems (e.g., a standalone, client or server computer system) or one or more components of a computer system (e.g., a processor or a group of processors) may be configured by software (e.g., an application or application portion) as a "component" that operates to perform certain operations as described herein.

In various embodiments, a "component" may be implemented mechanically or electronically. For example, a component may comprise dedicated circuitry or logic that is permanently configured (e.g., within a special-purpose processor) to perform certain operations. A component may also comprise programmable logic or circuitry (e.g., as encompassed within a general-purpose processor or other programmable processor) that is temporarily configured by software to perform certain operations. It will be appreciated that the decision to implement a component mechanically, in dedicated and permanently configured circuitry, or in temporarily configured circuitry (e.g., configured by software) may be driven by cost and time considerations.

Accordingly, the term "component" should be understood to encompass a tangible entity, be that an entity that is physically constructed, permanently configured (e.g., hardwired) or temporarily configured (e.g., programmed) to operate in a certain manner and/or to perform certain operations described herein. Considering embodiments in which components are temporarily configured (e.g., programmed), each of the components need not be configured or instantiated at any one instance in time. For example, where the components comprise a general-purpose processor configured using software, the general-purpose processor may be configured as respective different components at different times. Software may accordingly configure a processor, for example, to constitute a particular component at one instance of time and to constitute a different component at a different instance of time.

Components can provide information to, and receive information from, other components. Accordingly, the described components may be regarded as being communicatively coupled. Where multiple of such components exist contemporaneously, communications may be achieved through signal transmission (e.g., over appropriate circuits and buses) that connect the components. In embodiments in which multiple components are configured or instantiated at different times, communications between such components may be achieved, for example, through the storage and retrieval of information in memory structures to which the multiple components have access. For example, a one component may perform an operation, and store the output of that operation in a memory device to which it is communicatively coupled. A further component may then, at a later time, access the memory device to retrieve and process the stored output. Components may also initiate communications with input or output devices, and can operate on a resource (e.g., a collection of information).

The term "module", as used herein, should be understood to refer more broadly to a tangible component or a software component, or any combination thereof. Accordingly, a module may be implemented in electronic circuitry, hardware, firmware, software or a combination thereof.

Electronic Apparatus and System

Example embodiments may be implemented using a computer program product, e.g., a computer program tangibly embodied in an information carrier, e.g., in a machine-readable medium for execution by, or to control the operation of, data processing apparatus, e.g., a programmable processor, a computer, or multiple computers.

A computer program can be written in any form of programming language, including compiled or interpreted languages, and it can be deployed in any form, including as a stand-alone program or as a module, subroutine, or other unit suitable for use in a computing environment. A computer program can be deployed to be executed on one computer or on multiple computers at one site or distributed across multiple sites and interconnected by a communication network.

In example embodiments, operations may be performed by one or more programmable processors executing a computer program to perform functions by operating on input data and generating output. Method operations can also be performed by, and apparatus of example embodiments may be implemented as, special purpose logic circuitry, e.g., an FPGA (field programmable gate array) or an ASIC (application-specific integrated circuit).

The computing system can include clients and servers. A client and server are generally remote from each other and typically interact through a communication network. The relationship of client and server arises by virtue of computer programs running on the respective computers and having a client-server relationship to each other. In embodiments deploying a programmable computing system, it will be appreciated that that both hardware and software architectures require consideration. Specifically, it will be appreciated that the choice of whether to implement certain functionality in permanently configured hardware (e.g., an ASIC), in temporarily configured hardware (e.g., a combination of software and a programmable processor), or a combination permanently and temporarily configured hardware may be a design choice. Below are set out hardware (e.g., machine) and software architectures that may be deployed, in various example embodiments.

Example Machine Architecture and Machine-Readable Medium

Figure 7:
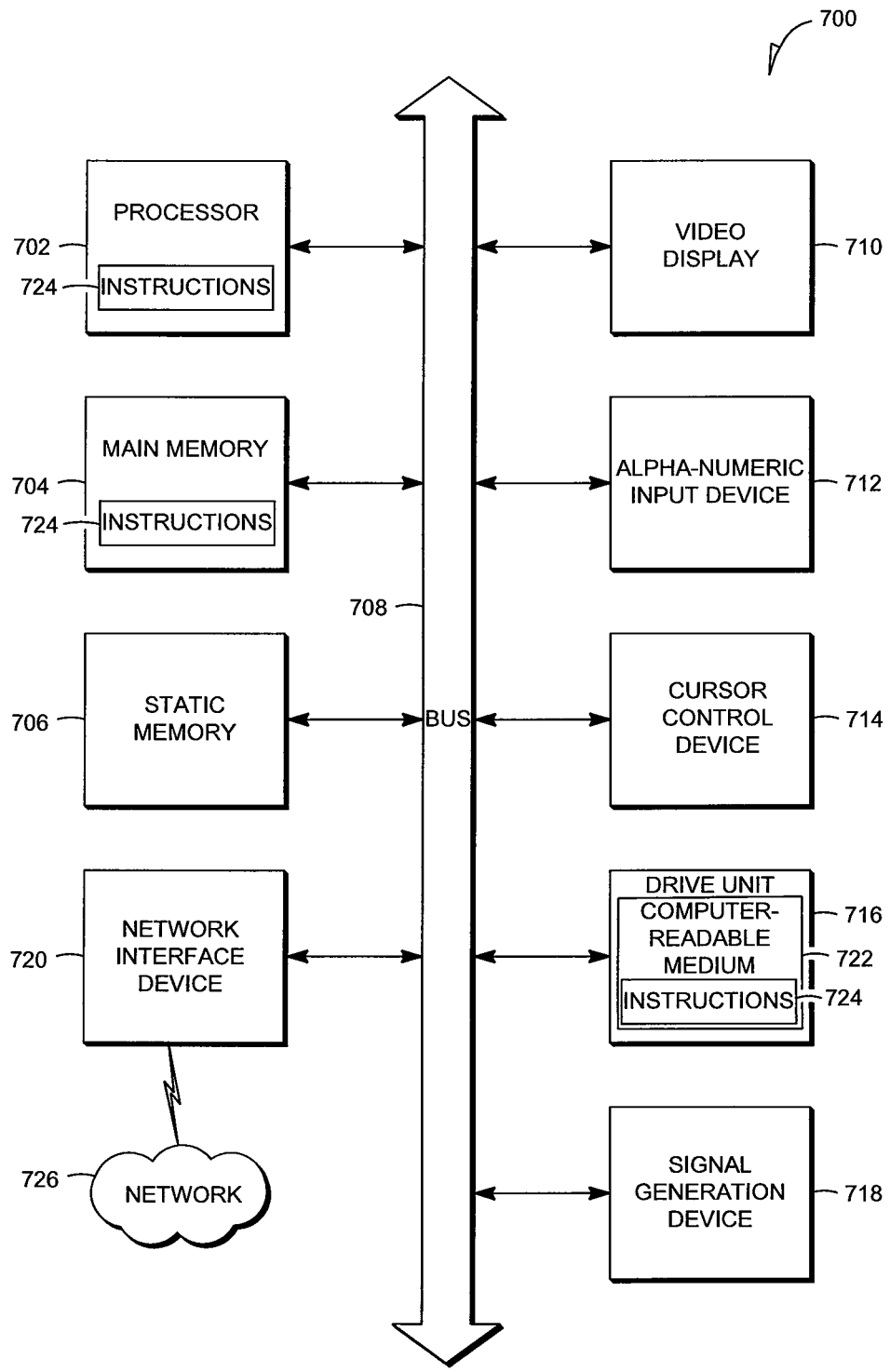
FIG. 7 is a block diagram of machine in the example form of a computer system within which set instructions, for causing the machine to perform any one or more of the methodologies discussed herein, may be executed.

FIG. 7 is a block diagram of machine in the example form of a computer system 700 within which instructions, for causing the machine to perform any one or more of the methodologies discussed herein, may be executed. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 700 includes a processor 702 (e.g., a central processing unit (CPU), a graphics processing unit (GPU) or both), a main memory 704 and a static memory 706, which communicate with each other via a bus 708. The computer system 700 may further include a video display unit 710 (e.g., a liquid crystal display (LCD) or a cathode ray tube (CRT)). The computer system 700 also includes an alphanumeric input device 712 (e.g., a keyboard), a user interface (UI) navigation device 714 (e.g., a mouse), a disk drive unit 716, a signal generation device 718 (e.g., a speaker) and a network interface device 720.

Machine-Readable Medium

The disk drive unit 716 includes a machine-readable medium 722 on which is stored one or more sets of instructions and data structures (e.g., software 724) embodying or utilized by any one or more of the methodologies or functions described herein. The software 724 may also reside, completely or at least partially, within the main memory 704 and/or within the processor 702 during execution thereof by the computer system 700, the main memory 704 and the processor 702 also constituting machine-readable media.

While the machine-readable medium 722 is shown in an example embodiment to be a single medium, the term "machine-readable medium" may include a single medium or multiple media (e.g., a centralized or distributed database, and/or associated caches and servers) that store the one or more instructions. The term "machine-readable medium" shall also be taken to include any tangible medium that is capable of storing, encoding or carrying instructions for execution by the machine and that cause the machine to perform any one or more of the methodologies of the present invention, or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including by way of example semiconductor memory devices, e.g., EPROM, EEPROM, and flash memory devices; magnetic disks such as internal hard disks and removable disks; magneto-optical disks; and CD-ROM and DVD-ROM disks.

Transmission Medium

The software 724 may further be transmitted or received over a communications network 726 using a transmission medium via the network interface device 720 utilizing any one of a number of well-known transfer protocols (e.g., HTTP). Examples of communication networks include a local area network ("LAN"), a wide area network ("WAN"), the Internet, mobile telephone networks, Plain Old Telephone (POTS) networks, and wireless data networks (e.g., WiFi and WiMax networks) The term "transmission medium" shall be taken to include any intangible medium that is capable of storing, encoding or carrying instructions for execution by the machine, and includes digital or analog communications signals or other intangible medium to facilitate communication of such software.

Although an embodiment has been described with reference to specific example embodiments, it will be evident that various modifications and changes may be made to these embodiments without departing from the broader spirit and scope of the invention. Accordingly, the specification and drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

What is claimed is:

1. A method comprising:
   retrieving a content file having content information and associated user interface information including at least one executable user interface object used to generate a user interface element, the user interface information relating to user interface elements of a presentation application to present the content information;
   verifying, using at least one processor, the user interface information embedded in the content file using a security component of the presentation application;
   implementing security by enforcing rights and constraints indicated in content security data included within the content file to be observed by the presentation application together with enforcing presentation application security defined by application security data of the presentation application;
   presenting the content information using the presentation application; and
   presenting user interface elements for the presentation application using the user interface information associated with the content information during the presentation of the content information.

2. The method of claim 1, wherein the executable user interface object comprises a user interface scriptable object.

3. The method of claim 1, wherein the user interface information comprises configuration information used by the executable user interface object to present the user interface elements.

4. The method of claim 1, wherein the presentation of the user interface elements for the presentation application is performed using a player application that executes the executable user interface object, and that interacts with the presentation application via an Application Program Interface (API) of the presentation application.

5. The method of claim 1, wherein the verifying includes verifying the user interface information against security requirements associated with the presentation application.

6. The method of claim 1, wherein the verifying includes verifying the user interface information against security requirements associated with the content information.

7. The method of claim 1, wherein the retrieving of the content information on the associated user interface information includes:
   retrieving the content file that includes the content information and the associated user interface information;
   parsing the content file to identify the executable user interface object embedded in the content file; and
   executing the executable user interface object to generate the user interface element, the executable user interface object to retrieve configuration information included in the associated user interface information via the security component of the presentation application.

8. The method of claim 1, including receiving the user interface information, and associating the user interface information with the content information.

9. The method of claim 1, wherein the user interface elements are at least one of skin or chrome elements of a user interface of the presentation application.

10. The method of claim 1, wherein the user interface elements of the presentation application include at least one of buttons, check boxes, indicia, menus, bookmarks, toolbars, navigation panels or icons.

11. The method of claim 1, wherein the presenting of user interface elements comprises presenting at least one user interface element of the presentation application and at least one user interface element specified by the user interface information.

12. A system comprising:
   at least one processor;
      an application interface component to retrieve a content file having content information and associated configuration information including at least one executable user interface object to generate a user interface element from a memory, the configuration information relating to user interface elements of a presentation application to present the content information;
      a security component to verify, using the at least one processor, the configuration information embedded in the content file and to implement security by enforcing rights and constraints indicated in content security data included within the content file to be observed by the presentation application together with enforcing presentation application security defined by application security data of the presentation application; and
      a presentation component to present the content information, and to present the user interface elements for the presentation application using the configuration information associated with the content information during the presentation of the content information.

13. The system of claim 12, wherein the configuration information comprises configuration information used by the executable user interface object to present the user interface elements.

14. The system of claim 12, wherein the presentation component includes a user interface renderer that executes the executable user interface object and that interacts with the presentation application via the application interface component.

15. The system of claim 12, wherein the security component is to verify the configuration information against security requirements associated with the presentation application and to verify the user information against security requirements associated with the content information.

16. The system of claim 12, wherein the application interface component is to retrieve the content file that includes the content information and the associated configuration information including the at least one embedded user interface object to generate a user interface element, and wherein the system includes a parser to parse the content file to identify the executable user interface object embedded in the content file, and wherein the presentation component is to execute the executable user interface object to generate the user interface element, the executable user interface object to retrieve configuration information included in the associated configuration information via the security component.

17. A non-transitory machine-readable medium having instructions that, when executed by processor of a machine, cause the machine to perform operations comprising:
  configuring a user interface of an application according to first interface configuration information associated with first content presented by the application;
  implementing security by enforcing rights and constraints indicated in content security data included within a content file to be observed by the application together with enforcing application security defined by application security data of the application; and
  reconfiguring the user interface of the application according to second interface configuration information associated with second content presented by the application, the second interface configuration information being stored in the content file containing the first and second content and including at least one executable interface object used to generate a user interface element used to reconfigure the user interface of the application.

18. The non-transitory machine-readable medium of claim 17, wherein the operations include configuring the user interface according to both the first interface configuration information and application configuration information associated with the application.

19. The non-transitory machine-readable medium of claim 17, wherein the configuration information include the executable user interface object and associated data that is used by the executable user interface object during execution thereof.

20. The non-transitory machine-readable medium of claim 17, wherein the first content is at least one of document, graphic, image, audio or video content.

21. The non-transitory machine-readable medium of claim 17, wherein the application interfaces with a player application, the player application to use the first interface configuration information to configure the user interface of the application.

22. The non-transitory machine-readable medium of claim 17, wherein the operations include verifying the first and second interface configuration information using a security mechanism of the application.

23. A non-transitory machine-readable medium with a data structure for a document, the data structure comprising:
  a content file including:
    content information to be presented by a presentation application;
    content security data indicating rights and constraints to be observed by the presentation application together with presentation application security defined by application security data of the presentation application; and
    user interface information including at least one executable user interface object used to generate a user interface element, the user interface information relating to user interface elements of the presentation application, the user interface elements being configured according to the user interface information during presentation of the content information by the presentation application.

24. The non-transitory machine-readable medium of claim 23, wherein the data structure comprises content security information specifying security constraints with respect to the content information.

25. The non-transitory machine-readable medium of claim 23, wherein the executable user interface object comprises a scriptable user interface object.

* * * * *